United States Patent [19]

Wu

[11] Patent Number: 5,846,657

[45] Date of Patent: Dec. 8, 1998

[54] LIQUID CRYSTAL DISPLAYS CONTAINING SPACERS AND METHODS FOR PRODUCING THE SPACER

[75] Inventor: Jiun-Chen Wu, Robbinsville, N.J.

[73] Assignee: Rohm and Haas Company, Philadelphia, Pa.

Related U.S. Application Data

[60] Provisional application No. 60/022,707 Jul. 25, 1996.

[21] Appl. No.: 888,488

[22] Filed: Jul. 7, 1997

[51] Int. Cl.$^6$ .............................. B32B 5/16; C08F 20/10
[52] U.S. Cl. ...................... 428/402; 526/323.2; 359/81
[58] Field of Search ................... 526/323.2; 428/402; 359/81

[56] References Cited

U.S. PATENT DOCUMENTS

| | | |
|---|---|---|
| 4,186,120 | 1/1980 | Ugelstad . |
| 4,277,536 | 7/1981 | Podszum et al. . |
| 4,336,173 | 6/1982 | Ugelstad . |
| 4,414,278 | 11/1983 | Cohen et al. . |
| 5,147,937 | 9/1992 | Frazza et al. . |
| 5,231,527 | 7/1993 | Takanashi et al. . |
| 5,237,004 | 8/1993 | Wu et al. . |
| 5,238,736 | 8/1993 | Tseng et al. ............ 428/402 |
| 5,346,954 | 9/1994 | Wu et al. . |
| 5,439,716 | 8/1995 | Larsen .................... 428/402 |
| 5,521,266 | 5/1996 | Lau . |

FOREIGN PATENT DOCUMENTS

| | | | |
|---|---|---|---|
| 63-79065 | 4/1988 | Japan .................... 428/402 |
| WO 92/06402 | 4/1992 | WIPO . |

OTHER PUBLICATIONS

"Preparation of Nonspherical, Monodisperse Polymer Particles and Their Self–Organization", A. T. Skjeltorp, J. Ugelstad, T. Ellingsen, Journal of Colloid and Interface Science, vol. 113, No. 2, pp. 577–582, Oct. 1986.

"Advances in Colloid and Interface Science", J. Ugelstad. P. C. Mark, 13, 101–140 (1980).

"New Developments in Production and Application of Monosized Polymer Particles". J. Ugelstad, T. Ellingsen, A. Berge, Polym Matur Sci Eng, 54, pp. 521–525, 1986.

*Primary Examiner*—Bernard Lipman
*Assistant Examiner*—N. Sarofin
*Attorney, Agent, or Firm*—John Lemanowicz; Darryl Frickey; Kevin Gironda

[57] ABSTRACT

Methods for preparing uniformly sized polymer particles comprised of multi-functional monomers such as poly(1,4-butanediol diacrylate) and poly(1,6-hexanediol diacrylate) are disclosed. The particles are of a size, uniformity, and contan physical characteristics that make them ideally suitable for use as spacers in liquid crystal display devices.

10 Claims, No Drawings

LIQUID CRYSTAL DISPLAYS CONTAINING SPACERS AND METHODS FOR PRODUCING THE SPACER

This is a nonprovisional application of prior pending provisional application Ser. No. 60/022,707 filed Jul. 25, 1996.

BACKGROUND OF THE INVENTION

This invention relates to polymeric compositions made from multi-functional monomers, especially multi-functional acrylate monomers such as 1,4-butanediol diacrylate and/or 1,6-hexanediol diacrylate, a process to make the polymeric compositions, and the use of the polymeric compositions as spacers in liquid crystal displays. Other embodiments of the invention relate to providing the spacer particles with adhesive properties or conductive properties or further coloring the spacer particles.

It is very important to have precise control of the thickness of the liquid-crystal layer in liquid-crystal-based displays. The liquid-crystal layer acts as an electro-optic light valve that works in conjunction with polarizers to modulate the transmission of light through a display between two states: one of off, where the liquid crystals block substantially all light; and one of on, where the liquid crystals allow transmission of light. Irregularities in the thickness of the liquid-crystal layer, also known as the cell gap, result in uneven display performance affecting such properties as contrast, transmittance, and the response time of the liquid-crystal layer to an electric signal.

Liquid crystal displays have a structure such that two substrates, generally glass or plastic sheets, are disposed opposite to each other through optionally a color filter on the inside surface of the top substrate (top is the side toward the viewer), an alignment layer, an electrode layer, a spacer particle, and a liquid crystal layer. A purpose of the spacer particle is to control the thickness of the liquid crystal layer and another purpose is to provide a uniform thickness of the liquid crystal layer over the entire active area of the display. Other means for controlling the cell gap include the flatness of the substrate material, the flatness of the layers between the substrates, the number of spacer particles in any given area, and the spatial distribution of spacer particles with respect to one another.

Particles generally suitable for use as spacers in liquid crystal displays are chosen from among: glass; oxides of silica, alumina or other ceramics; and plastics. The shape of particles generally suitable for use as spacers in liquid crystal displays are chosen from among: cylindrical rods having aspect ratios from about 1:2 to greater than 1:10; and spherical balls. The choice of spacer particles is largely dictated by the characteristics of the spacer particles that include but are not limited to: uniformity of the particle diameter, amount of impurities that may leach into the liquid crystal layer, compatibility with the liquid crystal layer, hardness, compressibility, coefficient of thermal expansion, elastic modulus, refractive index, thermal stability, and dielectric constant.

The importance of spacer particles in maintaining the cell gap has been described herein. In addition, spacer particles are very important in establishing the correct cell gap during the assembly of liquid crystal displays. The liquid-crystal display assembly process generally requires the following steps: a) spacer particles are deposited in a pre-determined concentration onto one sheet of glass or plastic substrate, b) a sealant is applied along the edge of the same substrate in a fashion similar to a picture frame leaving a small gap that will later be used for filling with the liquid crystal material, c) a second sheet of glass or plastic substrate is placed over the first substrate containing the spacer particles and the adhesive, d) the two substrates are pressed together at an elevated temperature to cure the adhesive and therefore sealing the substrates together. The properties of the spacer particles must be such that the particles do not degrade during the application of heat and pressure in the sealing process; the spacer particles must have sufficient thermal stability to withstand heating and also good compression strength so as to not break or fracture under load.

Plastic spacers will deform in the edge-sealing process described above. The extent of deformation can vary significantly, and is a function of the composition of the spacer, the amount of pressure applied during the sealing process, and the heat applied during the sealing process. It is preferred that a plastic spacer deform slightly when exposed to heat and pressure and then recover some or all of its original shape when the heat and pressure are removed. The extent of recovery, or alternatively, the extent to which the spacer particle is deformed and then resumes some or all or its original diameter, is known as the recovery factor. The recovery factor is described in detail in W.O. Patent 9206402, see in particular FIG. 4 of the cited patent application. In the measurement of recovery factor a given load is applied to a spacer particle and the displacement of the spacer caused by the load is measured ($L_1$). The load is then removed and the extent to which the original particle diameter recovers is given as ($L_2$). The recovery factor is calculated by ($L_2/L_1$). In view of the variations in display quality, there is a continuing need for spacer particles that have a balance of properties affecting control of the cell gap during, and after, the cell sealing process and impacting both the thermal stability and the recovery factor of the spacer.

W.O. Pat. Appl. No. 9206402 discloses spheres with certain elastic modulus and recovery factor properties. The spheres may be applied as spacers for liquid-crystal display elements. The spheres are made of polydivinylbenzene, divinylbenzene-styrene copolymer, divinylbenzene-acrylate copolymers, or polydiallylphthalate.

U.S. Pat. No. 5,231,527 discloses a liquid crystal display with two sheets of substrates disposed opposite to each other, transparent electrodes, orientation films, a spacer particle with a certain range of elastic modulus, and a liquid crystal layer. The spacer particle may be made of a crosslinked vinyl copolymer.

Despite the teachings of the disclosures, there is a continuing need to provide improved spacer particles of uniform size which, and which possess, desirable physical characteristics.

SUMMARY OF THE INVENTION

The present invention provides in one aspect, a composition comprising a homopolymer or copolymer, comprising as polymerized units, of multi-functional acrylates and a process for producing a particle suitable for use as a spacer comprising:

a) forming polymeric pre-seed particles by the emulsion polymerization of an ethylenically unsaturated monomer;

b) increasing the size of pre-seed particles by emulsion polymerization to form seed particles that are capable of being increased in diameter;

c) swelling the seed particles, optionally in the presence multi-functional monomers, preferably 1,4-butanediol diacrylate and/or 1,6-hexanediol diacrylate, suitable for use as a spacer.

In a second aspect of the present invention, there is provided a liquid crystal display containing a spacer particle formed from a homopolymer or copolymer, comprising of multi-functional monomer units.

DETAILED DESCRIPTION OF THE INVENTION

The spacers of the present invention are used in liquid display devices which are known in the art and described in the literature. Typical liquid crystal display arrangements are described in PCT 92/06402 and U.S. Pat. No. 5,231,527. Liquid crystal display arrangements of the present invention comprise two sheets of substrates disposed opposite to each other; with transparent electrodes disposed on each of said substrates and orientation films disposed over transparent electrode, the spacer particle of the present invention and a liquid crystal layer disposed over the orientation films.

The seed particles of the present invention are increased in size, i.e., diameter, through the addition of a multi-functional monomer. As used throughout the specification, multi-functional monomers are understood to contain two or more polymerizable groups. Suitable multi-functional monomers may contain two, three, four or more polymerizable groups. Suitable monomers include tetraethylylene glycol diacrylate, tripropyleneglycol diacrylate, ethoxylated-bis phenol-A diacrylate, trimethylolpropane triacrylate, pentaerythitrol triaacrylate, ethoxylated trimethylolpropane triacrylate, trivinylcyclohexane and pentaerythritol tetra-acrylate. Especially preferred are the di-functional acrylate monomers 1,6-hexanediol diacrylate (HDDA); 1,4-butanediol diacrylate (BDDA); and mixtures thereof As used throughout this specification, it is understood that mixtures of the various monomers are within the scope of the invention.

The final diameter of the spacer particles is preferably from about 1.0 to 15.0 microns, more preferably from 3.0 to 10.0 microns, and most preferably from about 4.0 to 7.0 microns. The present invention provides excellent control of the particle size uniformity; that is, the particles are made with a very narrow particle-size distribution.

The particle size distribution is such that the standard deviation of the particle size is typically 5% or less of the mean diameter, preferably the standard deviation of the particle size is 4% or less of the mean diameter and most preferably the standard deviation of the particle size is 3% or less of the mean diameter. Surprisingly the present invention provides for a standard deviation that is invariant with particle size diameter, such that a particle with a diameter of one micron has substantially the same standard deviation based on diameter as a particle with a diameter of five microns and additionally a particle with a diameter of ten microns. Previous disclosures have standard deviations of particle size that vary with varying particle diameter. Previous disclosures have standard deviations ranging from 4.5% to 7.0% based upon particle diameter for diameters ranging from 3.0 microns to 11 microns, respectively.

A further advantage of the present invention is the substantial elimination of classification processes to produce the narrow particle size distributions described hereinabove. The narrow particle size distribution is surprisingly inherent to the process of making the spacer particles. The removal of aggregates and fines is minimized, and does not significantly diminish the yield of spacer particles within the target particle size and having the desired particle size distribution.

The present invention also provides excellent control of the particle diameter whereby knowing the number of seed particles, and controlling precisely the addition of multi-functional monomer, one can predict the diameter of the spacer particles and control precisely the diameter of the spacer particles. The diameter can be controlled to produce spacer particles from about 1.0 to 15.0 microns in diameter and in increments of every 0.1 microns.

A means for controlling particle diameter is provided by the geometric relationship between volume and diameter and the volume decrease as a result of converting monomers to a polymer. The relationship can be expressed as follows:

$D_{spacer} = (D_{seed})((\text{Volume increase} - 1)(\text{Shrinkage factor}))^{0.3}$, wherein:

$D_{seed}$ is the diameter of the seed particle;

Volume increase = ((target diameter of the spacer)/(particle diameter of the seed))$^3$; and Shrinkage factor is the volume decrease as a result of converting monomers to a polymer.

For common monomer/polymer systems, one can obtain shrinkage factor values from *Encyclopedia of Polymer Science and Technology*, Vol. 5, p. 93, 1966. For less common monomer/polymer systems, shrinkage factors are derived experimentally from the measured volume of the swollen seed versus the spacer particle or calculated from the densities of the monomer and resulting polymer Literature values for typical monomers have shrinkage values which range from 15 to 35. For example, methyl methacrylate has a shrinkage factor of approximately 21.2, n-butyl methacrylate has a value of 14.3, styrene has a value 14.5 and acrylonitrile has a value of 31.0.

The particles of the present invention are particularly useful as spacers due to their narrow particle size distribution and the physical characteristics these particles possess. The improvements in properties include enhanced mechanical properties such as improved compression strength, recovery factors and improved resistivity. Other improved properties include refractive index and coefficient of thermal expansion.

The area occupied by a spacer in a liquid crystal display does not contain any liquid crystal; the liquid crystal layer will be displaced by the spacer particle. Accordingly, a clear spacer will scatter some light and appear as a white area. This white area will increase the brightness of the display in the off-state (when no light is being transmitted through the display) and thus reduce the contrast between the on-state and the off-state. One mechanism to improve the contrast is to use a black, or other darkly colored, spacer. Therefore, in a preferred embodiment, the spacers of the present invention are colored. In a most preferred embodiment the spacers are colored black. Typical methods for coloring the spacer particles include staining, pigment mixing, and the addition of dyes to monomers prior to polymerization. Other techniques known in the art include imbibing colorants into the spacer particles or the reactive coupling of a colorant and the spacer particle. A preferred method of coloring the spacer is the reactive coupling of a colorant to a spacer particle.

In an especially preferred embodiment of the present invention the spacer particle is provided with adhesive properties. The adhesive properties aid in keeping the substrates from becoming misaligned from one another in the manufacturing process and also provide adhesion between the substrates after the manufacturing process. The adhesive properties may also reduce the movement of the spacers on the substrates and thereby reduce the potential for, or the amount of, damage to the substrates or coatings on the substrate.

There are known mechanisms for obtaining adhesion between articles: one is through the use of reactive coupling to create bonds; and another is through the use of thermoplastic materials known in the art. Reactive coupling is a process of creating a chemical bond between two articles through the generation of reactive functional groups. Reactive functional sites are amenable to chemical bond formations, including but not limited to free radicals, acidic, basic, and cationic sites. Methods for generating reactive functional sites can include UV radiation, thermal activation and other known processes.

A preferred embodiment of the present invention employs UV radiation to generate free radicals. It is believed that UV-cure adhesives adhere two surfaces through the following process: a) a spacer particle containing adhesive properties is exposed to ultraviolet radiation such that certain molecules within the adhesive create free radicals, and b) the free radicals form covalent bonds with reactive groups contained within the coatings on the substrate (for example, the alignment layer in a liquid crystal display) but may also form covalent bonds with reactive groups contained within the adhesive and also within the spacer particle in areas not having adhesive properties.

It is believed that thermal-cure adhesives adhere two articles through a process different from that of UV-cure adhesives. It is further believed that thermal-cure adhesives adhere articles through the following process: a) a spacer particle containing an adhesive layer, whereby the adhesive layer comprises a thermoplastic resin, is heated generally to a temperature above the glass transition temperature of the thermoplastic resin contained within, or substantially comprising, the adhesive layer, and b) the thermoplastic resin melts or otherwise deforms to form an attachment to the article, or coatings on the article, through a mechanism believed to entail intercalation, or pore-filling, of the thermoplastic adhesive material into pores or irregularities in the surface of the article or coatings on the article.

In an especially preferred embodiment, reactive coupling, preferably the generation of free radicals from UV absorption is employed in combination with a thermoplastic adhesive. An improvement of using both thermal-cure and UV-cure adhesives is the curing rate of the adhesive can be accelerated during the assembly of the liquid crystal display. An additional improvement of using both thermal-cure and UV-cure adhesives is the added adhesive strength afforded to the system by multiple points of contacts between the spacer and the substrates and the multiple mechanisms for achieving said contact being both thermoplastic and reactive coupling.

Suitable materials for use as thermoplastics include poly (meth)acrylate, polyolefins, polyurethanes and the like.

Suitable materials for use in reactive coupling include aryldiazonium salts, diarylhalonium salts, triarylsulfonium salts, epoxides, anhydrides, carboxylic acids, hydroxy-containing compounds, amines, nitrobenzyl esters, sulfones, phosphates, n-hydroxyimide sulfonates, cobalt-amine and alkyl amine salts, O-acyloximes and diazonaphthoquinones. A preferred embodiment is the use of reactive coupling agents which can be incorporated into a polymer. An especially preferred embodiment is the use of 2-hydroxy-(3-methacryloxy)-propyl-1-(2-benzoyl) benzoate, which is available from the Rohm and Haas Company.

In a highly preferred embodiment of the present invention, a mechanism is provided to incorporate a spacer with a thin layer on the outer-most surface of the spacer (also known as a vicinal layer) having adhesive properties, containing both reactive coupling and thermoplastics, such that the vicinal layer is a part of the spacer and is distinguishable from a coating contacting the surface of the spacer as previously disclosed in the art. The vicinal layer includes from 0.1 to 90 weight percent reactive coupling moieties and from 10 to 99.9 weight percent thermoplastic.

In another embodiment of the present invention conductive materials are applied to the surface of the spacer. The conductive material may be selected from conductive polymers, intrisinically conductive polymers, doped polymers, and metals. Suitable conductive polymers include polymers such as polyacrylonitrile butadiene styrene, polyvinyl chlorides, polyphenylene-based alloys, or polycarbonate blended with one or more anionic compounds to instill conductivity such as alkali salts, nonionic compounds such as fatty acid esters and cationic compounds such as quaternary ammonium salts. Suitable intrisinically conductive polymers include such as polythiophene, polypyrrole, poly(phenylenesulfide), poly(phenylenevinylene), polyacetylene, polyaniline and polyisothianaphthene. Suitable doped polymers include such as polyacetylene doped with either $I_3^-$ or $Na^+$; polypyrrole doped with $BF_4^-$ or $ClO_4^-$; polythiophene doped with $BF_4^-$, $ClO_4^-$, or $FeCl_4$; polyazulene doped with $BF_4^-$ or $ClO_4^-$; and polythienylenevinylene doped with $AsF_5$. Suitable metals include highly conductive species such as but not limited to copper, nickel, aluminum, gold and the like. Especially preferred is gold. Suitable methods for coating spacer particles with conductive materials are set forth at length in WO 9206402.

The particles which are used as spacers are prepared in a multi-step process which includes: 1) the emulsion polymerization of a pre-seed particle, which is preferably mildly crosslinked; 2) emulsion polymerization of pre-seed particles to form seed particles; 3) swelling of the seed particles with monomer and polymerizing said monomers to form highly-crosslinked spacer particles; and 4) the optional incorporation of adhesive properties, conductive coatings or colorants to the spacer particles.

To prepare spacer particles of the present invention, an aqueous emulsion of multi-functional monomers is combined with an aqueous emulsion of seed particles. Preferably, the combined emulsions are mechanically agitated at a rate sufficient to cause intimate mixing of the two emulsions but not so severe that shear forces cause coalescence of particles or particle breakdown. The seed particles are swelled by the monomer material, forming droplets. Following this primary swelling, the monomers are polymerized.

The seed particles are prepared in an aqueous emulsion from the emulsion polymerization of one or more ethylenically unsaturated monomers. Emulsion polymerization techniques are known to those skilled in the art. For example, emulsion polymerization techniques are discussed in U.S. Pat. Nos. 3,037,952 and 2,790,736. Emulsion polymerization techniques are also discussed in *Emulsion Polymerisation Theory and Practice*, D. C. Blackley, Applied Science Publishers Ltd., London (1975). In emulsion polymerization methods, a surfactant is typically used, and the size of seed particles formed is partly determined by the amount and type of surfactant. For purposes of the present invention, it is desirable to form seed particles of a size range from 0.1 to 1.0 microns in diameter, preferably from 0.3 to 0.8 and most preferably from 0.4 to 0.7 microns in diameter (Wu et al., U.S. Pat. No. 5,237,004; see, for example, Examples 1, 5, and 6). The particle size desired for the seed particles is determined by the target particle size for the spacer particles. Particles of a useful size range may be prepared with surfactant concentrations of from about 0.1 weight percent to about 5 weight percent, based on the total weight of monomers, depending on the type of surfactant used. When non-ionic surfactants are used, it may be preferred to use up to about 10 weight percent surfactant.

Common surfactants are well known to those skilled in the art, and may be found in, for example, Porter, M. R., *Handbook of Surfactants*, Chapman and Hall, New York, 1991. Examples of useful surfactants for the present invention include ionic surfactants such as, for example, sodium lauryl sulfate, dioctylsulfosuccinate, sodium polyoxyethylene lauryl ether sulfate, sodium dodecyl benzenesulfonate; and non-ionic surfactants such as, for example, glycerol aliphatic esters, polyoxyethylene aliphatic esters, polyoxyethylene alcohol ethers; and stearic acid monoglyceride. Preferably anionic surfactants are employed, such as for example, alkyl, aryl or alkanyl sulfates, sulfonates, phosphates or succinates and their ethoxylated derivatives, non-ionic surfactants and the like. Most preferably dodecylbenzone sulfonate is employed as a stabilizing agent.

Water soluble polymers such as polyvinyl alcohol, polyvinyl pyrrolidone, carboxyalkyl celluloses and hydroxyalkyl celluloses may also be incorporated into the polymerization mixture for additional stabilization of the pre-seed and seed particles.

The seed particles comprise polymer chains. The seed particles are preferably formed by polymerization in the presence of a pre-seed emulsion. The pre-seed emulsion is an emulsion of polymeric particles and is also formed by well-known aqueous emulsion methods. In order to achieve a high degree of swelling, it is important that the molecular weight of the seed particle polymer chains be low. The ability to swell the seed particle increases with decreasing molecular weight of the polymer comprising the seed particle. For example, a molecular weight of 200 to 2,000 provides the ability to swell the seed on a volume basis of from about 200 to 1,000 increase in volume. A higher molecular weight of 5,000 to 100,000 reduces the ability to swell the seed on a volume basis a factor of from about 5 to 15 increase in volume.

The pre-seed particles are also prepared in an aqueous emulsion from the emulsion polymerization of one or more ethylenically unsaturated monomers. In a highly preferred embodiment of the present invention the monomers used to form the pre-seed are selected from the group consisting of butyl acrylate, butylene glycol diacrylate, and allyl methacrylate. In a preferred embodiment, the seed particle is comprised of from 10 to 90 percent by weight butyl acrylate, from 5 to 45 percent by weight styrene, and from 5 to 45 percent by weight hexanethiol and in a most preferred embodiment, the seed particle is comprised of from 50 to 80 percent by weight butyl acrylate, from 10 to 25 percent by weight styrene, and from 10 to 25 percent by weight hexanethiol.

Emulsion polymerization processes of the present invention produces pre-seed particles with narrow particle size distributions, having a mean diameter within the range of from 0.05 to about 0.5 micron diameter, most preferably having a diameter of from 0.15 to 0.4 micron diameter. In a preferred embodiment, the pre-seed particle is comprised of from 40 to 100 percent by weight butyl acrylate, from 0 to 30 percent by weight butylene glycol diacrylate, and from 0 to 30 percent by weight allyl methacrylate. In a most preferred embodiment, the pre-seed particles are comprised of from 80 to 100 percent butyl acrylate, from 0 to 10 percent by weight butylene glycol diacrylate, and from 0 to 10 percent by weight allyl methacrylate.

The pre-seed polymer may be crosslinked. As is well known to those skilled in the art, crosslinking may be achieved by the use of polyethylenically unsaturated monomers. Examples of polyethylenically unsaturated monomers useful as crosslinkers for forming the pre-seed emulsion include allyl methacrylate (ALMA); dicyclopentenyl acrylate and methacrylate; glycidyl methacrylate; glycidyl acrylate; acrylate and methacrylate esters of neopentyl glycol monodicyclopentenyl ether, epoxy-containing acrylates and methacrylates; divinylbenzene and dicyclopentenyloxyethyl acrylate and methacrylate.

Ethylenically unsaturated monomers useful in forming the pre-seed particles include vinyl aromatic monomers such as styrene, α-methylstyrene, vinyltoluene, vinylanthracene; ethylvinylbenzene and vinylnaphthalene. Non-aromatic vinyl monomers, such as vinyl acetate, hydrolyzed vinyl acetate, vinyl chloride, acrylonitrile, (meth)acrylic acids and alkyl esters or amides of (meth)acrylic acids (such as methyl acrylate, methyl methacrylate, ethyl acrylate, butyl methacrylate, methyl methacrylamide and dimethylaminopropyl methacrylamide), may also be used in forming the seed particles of the present invention. The expression (meth)acrylic acid is intended to include methacrylic acid and acrylic acid; the expression is used similarly in, e.g., methyl (meth)acrylate, ethyl (meth)acrylate, and the like. Also useful are halogenated aromatic monomers, such as, for example, pentafluorophenyl methacrylate; and halogenated non-aromatic monomers, such as, for example, haloalky acrylates and methacrylates. Copolymers, such as those prepared from mixtures of any of the aforementioned monomers, may also be prepared in forming the seed particles of the present invention. Especially preferred are mixtures of butyl acrylate, butylene glycol diacrylate and alkyl methacrylate.

Chain transfer agents such as, for example, mercaptans, polymercaptans, and polyhalogen compounds may optionally be added to the monomers in order to moderate molecular weight. Specific examples include alkyl mercaptans such as t-dodecyl mercaptans and hexanethiol; alcohols such as isopropanol, isobutanol, lauryl alcohol, and t-octyl alcohol; and halogenated compounds such as carbon tetrachloride, tetrachloroethylene, and trichlorbromoethane. For forming the seed particles, the amount of chain transfer agent required may be from about 5 percent to about 20 percent by weight, although amounts above 20 percent may be required depending on the molecular weight desired. It is preferred that the polymer chains have a molecular weight of from about 200 to about 10,000.

The amount of seed in the seed emulsion is determined by the desired final size of the spacer particles. The emulsion of seed particles may range up to 50 percent seed particles by weight, and has no theoretical lower limit.

For forming droplets with narrow particle size distributions containing multi-functional monomers, an emulsion of the monomers in water is used. The emulsion of multi-functional monomers may be from 1 percent to 80 percent monomers by weight, preferably from 50 percent to 70 percent. The emulsion of multi-functional monomers is combined with the aqueous emulsion of seed particles in either a batch-wise or a continuous addition process. In the case where the addition is by a batch process, the order of addition is not critical. The swelling of the seed with multi-functional acrylic monomer is accomplished such that the final particle size of the spacer is typically from 1.1 to about 10 times the diameter of the initial seed particle. The process of forming uniformly sized polymer particles useful as spacers in the present invention from seed polymer particles and water insoluble monomers is thoroughly described in U.S. Pat. No. 5,147,937. Other techniques for preparing spherical polymer particles are found in U.S. Pat. No. 5,346,954.

In order to ensure that the multi-functional acrylic monomers will swell the seed to form a particle, it is preferred that a transport agent be used. Suitable transport agents include acetone, methanol, isopropyl alcohol and methylene chloride. The transport agent may also be a macromolecular organic compound having a hydrophobic cavity. A macromolecular organic compound having a hydrophobic cavity is a polymeric molecule, typically cylindrical or approximately cylindrical, which typically has a hydrophilic exterior but has a hydrophobic interior. Such a compound may be used to transport hydrophobic substances in an aqueous environment.

Macromolecular organic compounds having a hydrophobic cavity, useful in the method of the present invention, include cyclodextrin and derivatives thereof, cyclic oligosaccharides having a hydrophobic cavity, such as cycloinulohexose, cycloinuloheptose, and cycloinuloctose; calyxarenes; and cavitands.

If a transport agent is used and the transport agent is macromolecular, cyclodextrin is the preferred macromolecular organic compound to be used as a transport agent. The selection of cyclodextrin and derivatives thereof useful in the method of the present invention is determined by the solubility of the cyclodextrin and cyclodextrin derivatives in the aqueous medium and by the solubility of the species formed by the association of the transport agent and the monomer. Suitable cyclodextrins useful in the method of the present invention include: α-cyclodextrin, β-cyclodextrin, and γ-cyclodextrin. The preferred cyclodextrin derivative is methyl β-cyclodextrin.

The cyclic oligosaccharides having a hydrophobic cavity, such as cycloinulohexose, cycloinuloheptose, and cycloinuloctose, are described by Takai et al in *Journal of Organic Chemistry*, 59(11), 2967–2975 (1994).

The calyxarenes useful in the method of the present invention are described in U.S. Pat. No. 4,699,966.

The cavitands useful in the method of the present invention are described in Italian patent application No. 22522 A/89 and by Moran et al in *Journal of the American Chemical Society*, 184, 5826–28 (1982).

The amount of transport agent to be used is partly determined by the composition of the transport agent. If the transport agent is a cyclodextrin, the weight ratio of cyclodextrin to monomer may range from about 1:1000 to about 10:100 and is typically from about 1:100 to about 5:100, more typically about 2:100. The lower limit is determined by such things as the desired rate of transport.

In a preferred embodiment, the amount of optional cyclodextrin is from 0 to 20 percent by weight based on the total monomer and optional cyclodextrin and in a most preferred embodiment the amount of optional cyclodextrin is from 0.5 to 10 percent by weight based on the total monomer and optional cyclodextrin.

Initiators useful for emulsion polymerization reactions can be water or oil soluble. Water soluble, free radical initiators are preferred for emulsion polymerizations. Initiators used to polymerize multi-functional monomers in the preparation of the spacer particle are preferably oil soluble.

The spacer particles formed by the method described herein exhibit many highly desirable physical characteristics, such as compression strength, recovery factor, resistivity, thermal expansion and refractive index.

Compression strength is the amount of force the particle can withstand before it crushes. The spacers of the present invention have a compression strength of greater than 150 kilograms per square millimeter ($kg/mm^2$). This high compression strength value is desired to ensure that spacer particles do not fracture or crush during the cell-sealing process.

The spacers of the present invention provide recovery factors of greater than 45 percent, preferably greater than 50 percent and most preferably greater than 53 percent. Recovery factors are important measurements because during cell sealing processes, typically, the two opposing substrates are compressed and the spacers must compress slightly with pressure and re-expand upon releasing the pressure. The recovery factor can be used to predict the cell-gap maintained after the cell-assembly process.

The resistivity of the spacers is also greatly improved by the spacers of the present invention. The spacers have resistivity of greater than $4.0 \times 10^{15}$ ohm-cm, Preferably the resistivity is greater than $5.0 \times 10^{15}$ ohm-cm. High resistivity is important in a spacer for liquid crystal displays. The liquid crystal molecules allow the transmission of light through a display in response to an electric field. Material within the liquid-crystal layer degrading the dielectric property of the liquid crystal layer, or alternatively increasing the conductivity of the liquid crystal layer, will adversely affect display performance.

The coefficient of thermal expansion of the spacers is also greatly improved by the spacers of the present invention. The spacers have coefficients of thermal expansion greater than $100 \times 10^{-6}/°$ C. and less than $125 \times 10^{-6}/°$ C. Preferably the coefficient of thermal expansion is greater than $110 \times 10^{-6}/°$ C. and less than $120 \times 10^{-6}/°$ C. The coefficient of thermal expansion of a spacer will define, in part, the spacers ability to expand and contract in response to temperature. Ideally, the coefficient of thermal expansion of a spacer will match that of the liquid crystal layer such that when the liquid crystal display is exposed to thermal cycling the expansion and contraction of the spacer particle will match the expansion and contraction of the liquid crystal layer. Sufficient mismatch of the coefficient of thermal expansion between that of the spacer and that of the liquid crystal layer may result in the formation of voids upon thermal cycling and adversely affect display performance.

The index of refractiion of a spacer is ideally matched to that of the substrate. The index of refraction for a glass substrate used in a liquid crystal display is in the range of 1.53 to 1.55. The spacers of the present invention have refractive indices of about 1.50.

The following examples are intended to illustrate various embodiments of the present invention, such as the process by which the compositions of this invention are made, the compositions of this invention, and the unexpected beneficial properties of the compositions of this invention when applied as spacers in liquid crystal displays.

EXAMPLE 1

Preparation of Pre-seed

The following mixtures were prepared:

| Mixture | Component | Parts by Weight[†] |
|---|---|---|
| A | water | 180 |
|   | sodium carbonate | 0.40 |
| B | butyl acrylate | 98.0 |
|   | butylene glycol diacrylate | 0.25 |
|   | allyl methacrylate | 1.75 |
|   | 22.5% aqueous sodium dodecylbenzenesulfonate | 2.22 |
|   | water | 40.8 |
| C | potassium persulfate | 0.06 |
|   | water | 11.9 |

[†]per 100 parts of monomer

A reactor equipped with a stirrer and condenser and blanketed with nitrogen was charged with Mixture A and heated to 82° C. To the reactor contents was added 10% of Mixture B and 25% of Mixture C. The temperature was maintained at 82° C. and the mixture was stirred for 1 hour, after which the remaining portions of Mixture B and Mixture C were added to the reactor, with agitation over a period of 90 minutes. Agitation was continued at 82° C. for 2 hours, after which the reactor contents were cooled to room temperature. The particle size of the resulting emulsion particles was 0.2 micron, as measured by a Brookhaven Instruments BI-90.

EXAMPLE 2

Preparation of Seed

The particles of Example 1 were grown to 0.5 micron diameter using an emulsion of butyl acrylate and styrene. The following mixtures were prepared:

| Mixture | Component | Parts by Weight[†] |
|---|---|---|
| D | water | 185 |
|   | Sodium carbonate | 0.081 |
|   | Emulsion from Example 1 at 29.6% solids | 30.30 |
| E | butyl acrylate | 82 |
|   | styrene | 18 |
|   | 10% aqueous sodium dodecylbenzenesulfonate | 2.5 |
|   | water | 32 |
| F | 1-hexanethiol | 18.8 |
|   | 10% aqueous sodium dodecylbenzenesulfonate | 2.8 |
|   | water | 11 |
| G | potassium persulfate | 0.11 |
|   | water | 18 |
| H | t-Butyl hydroperoxide 70X ® (from the Lucidol Division of Pennwalt Corp.) | 0.18 |
|   | water | 3.7 |
| I | 3% aqueous sodium formaldehyde sulfoxylate | 0.41 |

[†]per 100 parts of monomer

Mixture D was added to a reactor and heated to 88° C. with agitation. Mixtures E, F, and G were added, with agitation, to the reactor over a period of 3 hours, after which the temperature was maintained at 88° C., with agitation, for 90 minutes. The reactor contents were cooled to 65° C. Mixtures H and I were added, and the reactor contents were maintained at 65° C., for 1 hour, after which the reactor contents were cooled to room temperature. The resulting emulsion polymer particles had a diameter of 0.5 micron as measured by a Brookhaven Instruments BI-90.

EXAMPLE 3

Preparation of 4.90-micron pBDDA Particles

The particles of Example 2 werre grown to 4.9 micron diameter using an emulsion of 1,4-butanediol diacrylate. The following mixtures were prepared:

| Mixture | Component | Parts by Weight[†] |
|---|---|---|
| J | water | 210 |
|   | 3% aqueous Solusol ® (available from American Cyanamid, Fine Chemical Div.) | 1.52 |
| K | 1,4-butanediol diacrylate | 100 |
|   | 50.8% aqueous methyl beta-cyclodextran | 1.78 |
|   | 75% aqueous Solusol ® | 0.81 |
|   | water | 89 |
| L | Emulsion from Example 2 at 7.76% solids | 1.4275 |
|   | water | 12.5 |
| M | tert-Butyl peroctoate | 0.80 |
|   | 3% aqueous Solusol ® | 3.33 |
|   | 0.11% aqueous sodium p-nitrosophenolate | 1.50 |
|   | 10% aqueous poly(n-vinylpyrrolidone) | 50 |
|   | water | 17.5 |

[†]per 100 parts of monomer

Mixture J was added into a reactor and heated to 65° C. with agitation. Mixture K was blended in a Waring blender for 5 minutes to form an emulsion. Mixture L, and the blended emulsion K were charged into the reactor. The reactor was stirred at 60° C. for 2 hours and cooled to 25° C. Mixture M was blended in a Waring blender for 3 minutes to form an emulsion. This emulsion was added to the reactor. After 1 hour agitation at 25° C., the reactor was heated to 60° C. and held for 1 hour at 60° C. before heating to 70° C. Agitation was continued at 70° C. for 1.5 hours, after which the reactor contents were cooled to room temperature. The polymer particles from the reaction mixture, when examined by an optical microscope, were uniformly sized. When analyzed by a Coulter Corporation Multisizer IIE particle size analyzer, the particles had a mean diameter of 4.90 microns and a standard deviation is 0.19 micron.

The compositions of this invention were tested for compression strength, and recovery factor. A commercial spacer sample, Micropearl SP-205 from Sekisui Fine Chemical, was tested as a comparative example in each test. Results of the tests are given in Table 1.

TABLE 1

|   | SP-205 | pHDDA | pBDDA |
|---|---|---|---|
| Compression Strength (kg/mm$^2$) | 137 | 172 | 234 |
| Recovery Factor (%) | 44 | 53 | 47 | p HDDA = poly(1,6-hexanediol diacrylate)
p BDDA = poly(1,4-butanediol diacrylate)

The above results demonstrate the compositions of this invention have surprisingly improved compression strength and recovery factors compared with the spacer from the cited disclosure.

EXAMPLE 4

Preparation of 1.48-micron pBDDA Particles

In this example the particles in the emulsion of Example 2 are grown to 1.48 micron diameter using an emulsion of 1,4-butanediol diacrylate. The following mixtures were prepared:

| Mixture | Component | Parts by Weight† |
|---------|-----------|------------------|
| N | water | 210 |
|   | 3% aqueous Solusol ® | 1.52 |
| O | 1,4-butanediol diacrylate | 100 |
|   | 50.8% aqueous methyl beta-cyclodextran | 1.78 |
|   | 75% aqueous Solusol ® | 0.81 |
|   | water | 89 |
| P | Emulsion from Example 2 at 30.44% solids | 16.31 |
|   | water | 12.5 |
| Q | tert-Butyl peroctoate | 0.80 |
|   | 3% aqueous Solusol ® | 3.33 |
|   | 0.11% aqueous sodium p-nitrosophenolate | 1.50 |
|   | 10% aqueous poly(n-vinylpyrrolidone) | 50 |
|   | water | 17.5 |

†per 100 parts of monomer

Mixture N was added into a reactor and heated to 65° C. with agitation. Mixture M was blended in a Waring blender for 5 minutes to form an emulsion. Mixture P, and the blended emulsion O were charged into the reactor. The reactor was stirred at 60° C. for 2 hours and cooled to 25° C. Mixture Q was blended in a Waring blender for 3 minutes to form an emulsion. This emulsion was added to the reactor. After 1 hour agitation at 25° C., the reactor was heated to 60° C. and held for 1 hour at 60° C. before heating to 70° C. Agitation was continued at 70° C. for 1.5 hours, after which the reactor contents were cooled to room temperature. The polymer particles from the reaction mixture, when examined by an optical microscope, were uniformly sized. Analyzed by a particle size analyzer, Coulter Corporation Multisizer IIE, the particles have a mean diameter of 1.48 microns and the standard deviation is 0.05 micron.

EXAMPLE 5

Preparation of 1.52-micron pBDDA Particles

The particles in the emulsion of Example 2 are grown to 1.52 micron diameter using an emulsion of 1,4-butanediol diacrylate. The following mixtures were prepared:

| Mixture | Component | Parts by Weight† |
|---------|-----------|------------------|
| R | water | 210 |
|   | 3% aqueous Solusol ® | 1.52 |
| S | 1,4-butanediol diacrylate | 100 |
|   | 50.8% aqueous methyl beta-cyclodextran | 1.78 |
|   | 75% aqueous Solusol ® | 0.81 |
|   | water | 89 |
| T | Emulsion from Example 2 at 30.44% solids | 13.36 |
|   | water | 12.5 |
| U | tert-Butyl peroctoate | 0.80 |
|   | 3% aqueous Solusol ® | 3.33 |
|   | 0.11% aqueous sodium p-nitrosophenolate | 1.50 |
|   | 10% aqueous poly(n-vinylpyrrolidone) | 50 |
|   | water | 17.5 |

†per 100 parts of monomer

Mixture R was added into a reactor and heated to 65° C. with agitation. Mixture S was blended in a Waring blender for 5 minutes to form an emulsion. Mixture T, and the blended emulsion S were charged into the reactor. The reactor was stirred at 60° C. for 2 hours and cooled to 25° C. Mixture U was blended in a Waring blender for 3 minutes to form an emulsion. This emulsion was added to the reactor. After 1 hour agitation at 25° C., the reactor was heated to 60° C. and held for 1 hour at 60° C. before heating to 70° C. Agitation was continued at 70° C. for 1.5 hours, after which the reactor contents were cooled to room temperature. The polymer particles from the reaction mixture, when examined by an optical microscope, were uniformly sized. Analyzed by a particle size analyzer, Coulter Corporation Multisizer IIE, the particles have a mean diameter of 1.52 microns and the standard deviation is 0.05 micron.

EXAMPLE 6

Incorporation of Adhesive Property onto 4.90-micron pBDDA Particle

Adhesive chracteristics are incorporated onto the particles in the emulsion of Example 3. The following mixtures were prepared:

| Mixture | Component | Parts by Weight† |
|---------|-----------|------------------|
| V | Emulsion from Example 3 at 21.74% solids | 5000 |
|   | water | 139 |
| W | 3% aqueous Solusol ® | 2.28 |
|   | Sodium formaldehyde sulfoxylate | 0.07 |
|   | water | 1276 |
| X | 2-hydroxy-(3-methacryloxy)-propyl-1-(2-benzoyl)benzoate (Rohm and Haas Company) | 8.33 |
|   | tert-Butyl methacrylate | 91.67 |
| Y | tert-Butyl hydroperoxide 70X ® (from Lucidol Division of Pennwalt Corp.) | 0.15 |
|   | 3% aqueous Solusol ® | 5.07 |
|   | water | 634 |

†per 100 parts of monomer

Mixture V was added into a reactor and heated to 75° C. with agitation. One half of Mixture W was then charged into the reactor. The second half of Mixture W, and Mixtures X and Y were added into the reactor in 3 hours. Agitation was continued at 75° C. for 1 hours, after which the reactor contents were cooled to room temperature. The polymer particles from the reaction mixture, when examined by an optical microscope, remained uniformly sized. The incorporation of the 2-hydroxy-(3-methacryloxy)-propyl-1-(2-benzoyl)benzoate and tert-butyl methacrylate monomers imparted an adhesive property to the particles.

EXAMPLE 7

Preparation of 4.47-micron pBDDA Particles

The particles in the emulsion of Example 2 are grown to 4.47 micron diameter using an emulsion of 1,4-butanediol diacrylate. The following mixtures were prepared:

| Mixture | Component | Parts by Weight† |
|---------|-----------|------------------|
| A | water | 210 |
|   | 3% aqueous Solusol ® | 1.52 |
| B | 1,4-butanediol diacrylate | 100 |
|   | 50.8% aqueous methyl beta-cyclodextran | 178 |
|   | 75% aqueous Solusol ® | 0.81 |
|   | water | 89 |
| C | Emulsion from Example 2 at 7.76% solids | 1.7636 |
|   | water | 12.5 |
| D | tert-Butyl peroctoate | 0.80 |
|   | 3% aqueous Solusol ® | 3.33 |
|   | 0.11% aqueous sodium p-nitrosophenolate | 1.50 |
|   | 10% aqueous poly(n-vinylpyrrolidone) | 50 |
|   | water | 17.5 |

†per 100 parts of monomer

Mixture A was added into a reactor and heated to 65° C. with agitation. Mixture B was blended in a Waring blender for 5 minutes to form an emulsion. Mixture C, and the blended emulsion B were charged into the reactor. The reactor was stirred at 60° C. for 2 hours and cooled to 25° C. Mixture D was blended in a Waring blender for 3 minutes to form an emulsion. This emulsion was added to the reactor. After 1 hour agitation at 25° C., the reactor was heated to 60° C. and held for 1 hour at 60° C. before heating to 70° C. Agitation was continued at 70° C. for 1.5 hours, after which the reactor contents were cooled to room temperature. The polymer particles from the reaction mixture, when examined by an optical microscope, were uniformly sized. Analyzed by a particle size analyzer, Coulter Corporation Multisizer IIE, the particles have a mean diameter of 4.47 microns and the standard deviation is 0.14 micron.

EXAMPLE 8

Preparation of 4.58-micron pBDDA Particles

The particles in the emulsion of Example 2 are grown to 4.58 micron diameter using an emulsion of 1,4-butanediol diacrylate. The following mixtures were prepared:

| Mixture | Component | Parts by Weight† |
| --- | --- | --- |
| A | water | 210 |
|  | 3% aqueous Solusol ® | 1.52 |
| B | 1,4-butanediol diacrylate | 100 |
|  | 50.8% aqueous methyl beta-cyclodextran | 1.78 |
|  | 75% aqueous Solusol | 0.81 |
|  | water | 89 |
| C | Emulsion from Example 2 at 7.76% solids | 1.6462 |
|  | water | 12.5 |
| D | tert-Butyl peroctoate | 0.80 |
|  | 3% aqueous Solusol ® | 3.33 |
|  | 0.11% aqueous sodium p-nitrosophenolate | 1.50 |
|  | 10% aqueous poly(n-vinylpyrrolidone) | 50 |
|  | water | 17.5 |

†per 100 parts of monomer

Mixture A was added into a reactor and heated to 65° C. with agitation. Mixture M was blended in a Waring blender for 5 minutes to form an emulsion. Mixture C, and the blended emulsion B were charged into the reactor. The reactor was stirred at 60° C. for 2 hours and cooled to 25° C. Mixture D was blended in a Waring blender for 3 minutes to form an emulsion. This emulsion was added to the reactor. After 1 hour agitation at 25° C., the reactor was heated to 60° C. and held for 1 hour at 60° C. before heating to 70° C. Agitation was continued at 70° C. for 1.5 hours, after which the reactor contents were cooled to room temperature. The polymer particles from the reaction mixture, when examined by an optical microscope, were uniformly sized. Analyzed by a particle size analyzer, Coulter Corporation Multisizer IIE, the particles have a mean diameter of 4.58 microns and the standard deviation is 0.16 micron.

EXAMPLE 9

Preparation of 1.99-micron pBDDA Particles

In this example the particles in the emulsion of Example 2 are grown to 1.99 micron diameter using an emulsion of 1,4-butanediol diacrylate. The following mixtures were prepared:

| Mixture | Component | Parts by Weight† |
| --- | --- | --- |
| A | water | 210 |
|  | 3% aqueous Solusol ® | 1.52 |
| B | 1,4-butanediol diacrylate | 100 |
|  | 50.8% aqueous methyl beta-cyclodextran | 1.78 |
|  | 75% aqueous Solusol ® | 0.81 |
|  | water | 89 |
| C | Emulsion from Example 2 at 30.49% solids | 5.6681 |
|  | water | 12.5 |
| D | tert-Butyl peroctoate | 0.80 |
|  | 3% aqueous Solusol ® | 3.33 |
|  | 0.11% aqueous sodium p-nitrosophenolate | 1.50 |
|  | 10% aqueous poly(n-vinylpyrrolidone) | 50 |
|  | water | 17.5 |

†per 100 parts of monomer

Mixture A was added into a reactor and heated to 65° C. with agitation. Mixture M was blended in a Waring blender for 5 minutes to form an emulsion. Mixture C, and the blended emulsion B were charged into the reactor. The reactor was stirred at 60° C. for 2 hours and cooled to 25° C. Mixture D was blended in a Waring blender for 3 minutes to form an emulsion. This emulsion was added to the reactor. After 1 hour agitation at 25° C., the reactor was heated to 60° C. and held for 1 hour at 60° C. before heating to 70° C. Agitation was continued at 70° C. for 1.5 hours, after which the reactor contents were cooled to room temperature. The polymer particles from the reaction mixture, when examined by an optical microscope, were uniformly sized. Analyzed by a particle size analyzer, Coulter Corporation Multisizer IIE, the particles have a mean diameter of 1.99 microns and the standard deviation is 0.07 micron.

EXAMPLE 10

Preparation of 2.11-micron PBDDA Particles

The particles in the emulsion of Example 2 are grown to 2.11 micron diameter using an emulsion of 1,4-butanediol diacrylate. The following mixtures were prepared:

| Mixture | Component | Parts by Weight† |
| --- | --- | --- |
| A | water | 210 |
|  | 3% aqueous Solusol ® (available from American Cyanamid Fine Chemical Div.) | 1.52 |
| B | 1,4-butanediol diacrylate | 100 |
|  | 50.8% aqueous methyl beta-cyclodextran | 1.78 |
|  | 75% aqueous Solusol ® | 0.81 |
|  | water | 89 |
| C | Emulsion from Example 2 at 30.49% solids | 4.8757 |
|  | water | 12.5 |
| D | tert-Butyl peroctoate | 0.80 |
|  | 3% aqueous Solusol ® | 3.33 |
|  | 0.11% aqueous sodium p-nitrosophenolate | 1.50 |
|  | 10% aqueous poly(n-vinylpyrrolidone) | 50 |
|  | water | 17.5 |

†per 100 parts of monomer

Mixture A was added into a reactor and heated to 65° C. with agitation. Mixture M was blended in a Waring blender for 5 minutes to form an emulsion. Mixture C, and the blended emulsion B were charged into the reactor. The reactor was stirred at 60° C. for 2 hours and cooled to 25° C. Mixture D was blended in a Waring blender for 3 minutes to form an emulsion. This emulsion was added to the reactor. After 1 hour agitation at 25° C., the reactor was heated to 60° C. and held for 1 hour at 60° C. before heating to 70° C. Agitation was continued at 70° C. for 1.5 hours, after which the reactor contents were cooled to room temperature. The polymer particles from the reaction mixture, when examined by an optical microscope, were uniformly sized. Analyzed by a particle size analyzer, Coulter Corporation Multisizer IIE, the particles have a mean diameter of 2.11 microns and the standard deviation is 0.10 micron.

EXAMPLE 11

Application of Conductive Coating on a Particle

A 50 ml beaker was charged with 1.00 gram of spacer particles of the present invention with a mean particle size of 5.1 micrometers. 30 ml of Conditioner PM-922 (Shipley Company) was heated to 49° C. and charged into the beaker. The suspension was stirred intermittently with a glass stir rod and the beaker was placed on a hot plate to maintain the temperature. After 5 minutes the particles were isolated by filtration from the solution using a.0.45 micron filter disk (Micron Separation Inc.). The particles were rinsed 3 times with 20 ml portions of de-ionized water. The particles were then charged into a 50 ml beaker along with 30 ml of Neutralizer PM-954 from a heated reservoir maintained at 32° C. The suspension was placed on a hot plate to maintain the temperature and stirred intermittently for 5 minutes. The particles were then collected and washed 3 times with 20 ml portions of de-ionized water. The particles were then charged into a 50 ml beaker along with 30 ml of Cataposit 44® (Shipley Co.) heated to 32° C. The suspension was placed on a hot plate to maintain the temperature and stirred intermittently for 4 minutes. The particles were collected and washed 3 times with 20 ml portions of de-ionized water. The polymer particles were charged into a 50 ml beaker again and then 30 ml of Accelerator 19 (Shipley Co.) heated to 32° C. was added. The suspension was placed on a hot plate to maintain the temperature and stirred intermittently for 3 minutes. Then the sample was collected by filtration and washed three times with 20 ml aliquots of de-ionized water. The sample was again charged into a 50 ml beaker and then 30 ml of Niposit® Electroless Nickel PM-980 (Shipley Co.) was added and heated to 27° C. The suspension was stirred for 3 minutes and the beaker was placed on a hot plate to maintain the temperature. Upon addition of the Electroless Nickel solution a reaction occurred and the polymer particles turned from white to gray. The polymer particles were isolated and washed an additional three times with de-ionized water to completely remove any un-reacted nickel salts or reducing agent. The samples were then dried in an oven at 40° C. Obtained 0.92 g of a gray powder.

Under an optical microscope a metallic, mirror-like coating on the particles could be observed. The samples was analyzed by energy disperse x-ray using a PGT analyzer on an Electroscan environmental scanning electron microscope. Nickel could be detected on the coated particles, but not on the starting polymer particles.

EXAMPLE 12

Physical Testing Results

Spacer particles made with HDDA and BDDA were compared to a commercially available spacer sold by Sekisui Fire Chemicals, Micropearl SP-205. The physical property test results were as follows:

| Property | pBDDA | pHDDA | SP-205† | Sample | Remarks |
| --- | --- | --- | --- | --- | --- |
| Compression Strength, kg/mm$^2$ | 234 | 172 | 137 | spacer | measured @ 25° C. |
| Compressive Strength, kpsi | 16 | 13 | 16† | block | ASTM D695, JIS K7208† |
| Thermal Expansion Coef., 10$^{-6}$/°C. | 110 | 120 | 98† | sheet | avg.; from 20–80° C. |
| Recovery Factor (%) | 47 | 53 | 44 | spacer | |
| Decomposition Temp., °C., In Air (in Nitrogen) | 267 (346) | 256 (366) | 327† | spacer | TGA, 1% weight loss in air & nitrogen |
| Volume Resistivity, 10$^{15}$ Ohm cm | 5.3 | 4.2 | 0.36† | sheet | ASTM D257 |
| Dielectric Constant, @ 1 kHz | 1.6 | 1.7 | 2.9† | sheet | ASTM D150 |
| Transmittance | 92% | 92% | 86%† | sheet | |
| Haze | 2.6% | 1.2% | 3.5%† | sheet | |
| Refractive Index | 1.51 | 1.50 | 1.57† | sheet | |
| Volatile Component | 0.02% | 0.04% | 0.03% | spacer | 105° C. for 1 hour |
| Chemical Resistance | | | | sheet | % weight change after |
| Water | 0.7% | 0.3% | 0.5%† | | immersion for 10 days |
| 0.1N NaOH | 0.7% | 0.3% | -0.2%† | | at 20° C. |
| 0.1N HCl | 0.7% | 0.3% | 0.4%† | | |
| Acetone | 1.0% | 2.2% | 1.0%† | | |
| Toluene | 0.4% | 1.2% | — | | |

†From Sekisui Fine Chemical's product literature for Micropearl, SP grade

What is claimed is:

1. A plurality of spacers comprising crosslinked particles comprised of homopolymers or copolymers of multi-functional acrylate monomer selected from 1,4-butanediol diacrylate and 1,6-hexanediol diacrylate as polymerized units; wherein said cross-linked particles have a particle size of about 1 to about 15 microns with a standard deviation in particle size of less than 3% of the mean diameter, a compression value of greater than 150 kilograms per square millimeter, and a recovery factor of greater than 45 percents the standard deviation in particle size is invariant with particle size diameter and a narrow particle size distribution is achieved without classification processes.

2. The spacer of claim 1 wherein the coefficient of thermal expansion is from 100×10$^{-6}$/° C. to 125×10$^{-6}$/° C.

3. The spacer of claim 1 wherein the spacer contains adhesive properties.

4. The spacer of claim 1 wherein the spacer is coated with a conductive coating.

5. The spacer of claim 1 wherein the spacer is colored.

6. The spacer of claim 3 wherein the adhesive property is derived from a combination of reactive coupling and thermoplastic resins.

7. The spacer of claim 6 wherein the reactive coupling agent contains free radicals generated from the absorption UV radiation.

8. The spacer of claim 7 wherein the reactive coupling agent is 2-hydroxy-(3-methacryloxy)-propyl-1-(2-benzoyl) benzoate.

9. The spacer of claim 6 wherein the thermoplastic resin is tert-butyl methacrylate.

10. The spacer of claim 4 wherein the conductive coating is nickel or gold.

* * * * *